United States Patent
Varje et al.

(10) Patent No.: US 9,996,189 B2
(45) Date of Patent: Jun. 12, 2018

(54) DETECTING A TOOL USED ON A TOUCH SCREEN

(71) Applicant: NVIDIA Corporation, Santa Clara, CA (US)

(72) Inventors: Ilkka Varje, Uusimaa (FI); Kirill Artamonov, Uusimaa (FI); Aaron Bartholomew, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 127 days.

(21) Appl. No.: 15/147,824

(22) Filed: May 5, 2016

(65) Prior Publication Data
US 2017/0322661 A1    Nov. 9, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04108* (2013.01)

(58) Field of Classification Search
None
See application file for complete search history.

(56) References Cited

U.S. PATENT DOCUMENTS

| | | | | |
|---|---|---|---|---|
| 2013/0257796 A1* | 10/2013 | Kawai | ............... | G06F 3/0414 345/174 |
| 2014/0062913 A1* | 3/2014 | Lin | ..................... | G06F 3/044 345/173 |
| 2015/0242009 A1* | 8/2015 | Xiao | .................. | G06F 3/044 345/174 |

\* cited by examiner

*Primary Examiner* — Nicholas Lee (57) ABSTRACT

Detecting a tool used on a touch screen. In accordance with a method embodiment of the present invention, a cell value is accessed for each cell of a touch sensing device. The cell value indicates a force applied to the cell. A touch area sample count is determined as a count of how many of the cells have a cell value above a noise floor. A touch area weight is determined as a sum of all cell values for the cells having a cell value above the noise floor. An object touching the touch sensing device is identified based on the touch area sample count and the touch area weight. The object's touch indication may be rejected if the object is not identified. The identity of the object may be reported to a software application.

17 Claims, 12 Drawing Sheets

| 13 | 19 | 25 | 27 |
|----|----|----|----|
| 13 | 23 | 31 | 29 |
| 12 | 21 | 27 | 25 |
| 11 | 13 | 13 | 15 |

| 13 | 13 | 13 | 13 |
|----|----|----|----|
| 13 | 19 | 19 | 13 |
| 13 | 19 | 19 | 13 |
| 13 | 13 | 13 | 13 |

DETECTING A TOOL USED ON A TOUCH SCREEN

FIELD OF INVENTION

Embodiments of the present invention relate to the field of graphical user interface control. More specifically, embodiments of the present invention relate to systems and methods for detecting a tool used on a touch screen.

BACKGROUND

Touch screens, including capacitive touch screens, are commonly used to input information into a variety of devices, including, for example, smart phones, automated teller machines (ATMs), laboratory equipment, drawing capture devices, and the like. Touch screens may be used with a variety of tools to indicate a two-dimensional position on the touch screen. For example, position on a touch screen may be indicated by a finger, a variety of stylus-like devices, and the like, making contact with a touch screen. It is appreciated that such tools are not necessarily required to contact the touch screen, and that such tools may indicate information to the touch screen in addition to position, for example, such tools may indicate a pressure level.

It may be useful to determine a particular tool being used with a touch screen, from among a plurality of possible tools. For example, it may be useful to differentiate between a finger and a particular stylus device. In addition, it may be useful to differentiate among a number of different stylus devices. It is also useful to differentiate between "intended use" tools, e.g., fingers and styli, and other objects that may make "unwanted" contact with a touch screen, e.g., a palm or a side of a hand.

Based upon such differentiation, different actions may be taken based upon a particular tool in use. For example, use of a first stylus with a touch screen may indicate that a particular display region is filled with a first color, while use of a second stylus with the touch screen may indicate that a particular display region is filled with a second color. As another example, use of a finger with a touch screen may indicate a menu entry, while use of a stylus device with the touch screen may indicate entry of graphical information. As a further example, in a graphical application, input information from a stylus may be considered pertinent and used by the application, while input information from a finger, or hand, may be considered extraneous, and discarded. As a yet further example, touch input from a stylus may be accepted while a touch input from the side of a hand, occurring simultaneously with the stylus touch, may be ignored.

SUMMARY OF THE INVENTION

Therefore, what is needed are systems and methods for detecting a tool used on a touch screen. What is additionally needed are systems and methods for detecting a tool used on a touch screen that reduce system requirements and enable improved system performance. A further need exists for systems and methods for detecting a tool used on a touch screen that may differentiate among a variety of touch tools. A still further need exists for systems and methods for detecting a tool used on a touch screen that are compatible and complementary with existing systems and methods of touch screen, manufacture, test and operation. Embodiments of the present invention provide these advantages.

In accordance with a method embodiment of the present invention, a cell value is accessed for each cell of a touch sensing device. The cell value indicates a force applied to the cell. A touch area sample count is determined as a count of how many of the cells have a cell value above a noise floor. A touch area weight is determined as a sum of all cell values for the cells having a cell value above the noise floor. An object touching the touch sensing device is identified based on the touch area sample count and the touch area weight. The object's touch indication may be rejected if the object is not identified. The identity of the object may be reported to a software application.

In accordance with an embodiment in accordance with the present invention, an electronic system includes a capacitive touch sensing device, a processor coupled to the capacitive touch sensing device, and a memory coupled to the processor. The electronic system is configured to access a cell value for each cell of the touch sensing device, wherein the cell value indicates a force applied to the cell. In addition, the electronic system is configured to determine a touch area sample count as a count of how many of the cells have a cell value above a noise floor and to determine a touch area weight as a sum of all cell values for the cells having a cell value above a the noise floor. The electronic system is further configured to identify an object touching the touch sensing device based on the touch area sample count and the touch area weight.

In accordance with an embodiment in accordance with the present invention, an article of manufacture includes a non-transitory computer readable medium having instructions stored thereon that, responsive to execution by an electronic system, cause the electronic system to perform a variety of operations. The operations include accessing a cell value for each cell of a touch screen, wherein the cell value indicates a force applied to the cell, determining a touch area sample count as a count of how many of the cells have a cell value above a noise floor, and determining a touch area weight as a sum of all cell values for the cells having a cell value above a the noise floor. The operations also include identifying an object touching the touch screen based on the touch area sample count and the touch area weight.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

NOTATION AND NOMENCLATURE

Some portions of the detailed descriptions which follow (e.g., method 900) are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, data, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "accessing" or "selecting" or "determining" or "displaying" or "presenting" or "computing" or "sending" or "receiving" or "reducing" or "detecting" or "setting" or "accessing" or "placing" or "testing" or "forming" or "mounting" or "removing" or "ceasing" or "stopping" or "coating" or "processing" or "performing" or "generating" or "adjusting" or "creating" or "executing" or "continuing" or "indexing" or "translating" or "calculating" or "measuring" or "gathering" or "running" or the like, refer to the action and processes of, or under the control of, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The meaning of "non-transitory computer-readable medium" should be construed to exclude only those types of transitory computer-readable media which were found to fall outside the scope of patentable subject matter under 35 U.S.C. § 101 in In re *Nuijten*, 500 F.3d 1346, 1356-57 (Fed. Cir. 2007). The use of this term is to be understood to remove only propagating transitory signals per se from the claim scope and does not relinquish rights to all standard computer-readable media that are not only propagating transitory signals per se.

Detecting a Tool Used on a Touch Screen

Figure 1:
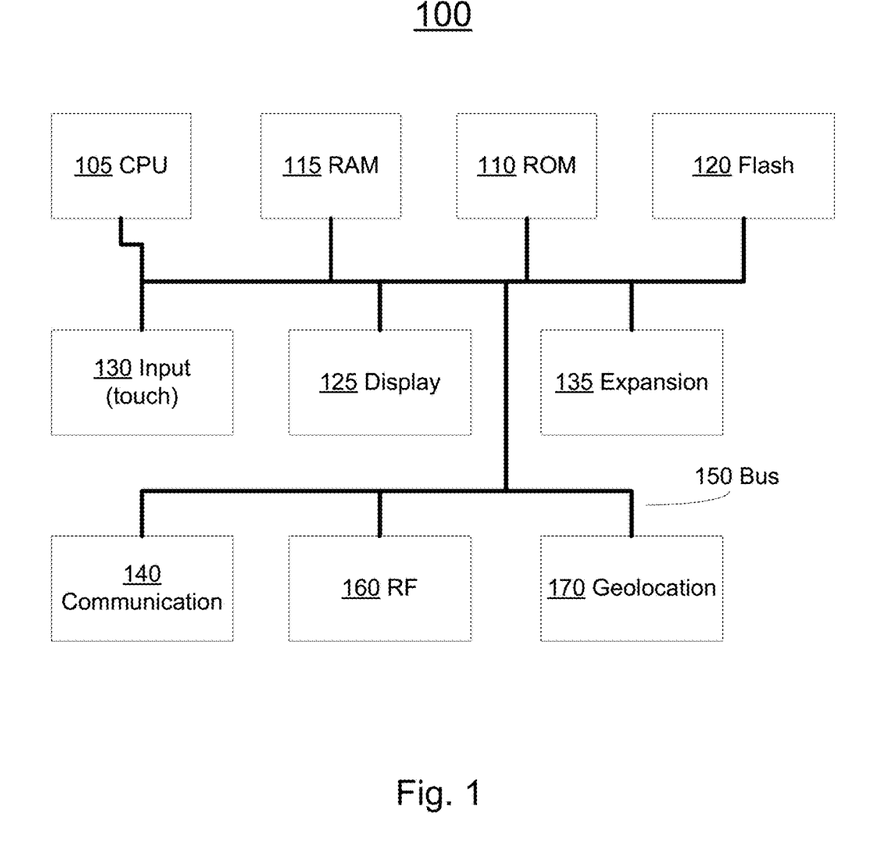
FIG. 1 illustrates an exemplary block diagram of an exemplary electronic system, which may be used as a platform to implement embodiments of the present invention.

FIG. 1 illustrates an exemplary block diagram of an exemplary electronic system 100, which may be used as a platform to implement embodiments of the present invention. Electronic system 100 may be battery-powered, in some embodiments. Electronic system 100 may be a "server" or "desktop" computer system, in some embodiments. Electronic system 100 may comprise a desktop or generally "fixed location" computer system, in some embodiments. Electronic system 100 may comprise a portable computer system, e.g., a "smart" phone. Electronic system 100 may comprise a "wearable" computer system, e.g., a "smart" watch or an "eye-glasses-mounted" computer system. Electronic system 100 includes an address/data bus 150 for communicating information, a central processor 105 functionally coupled with the bus for processing information and instructions. Central processor 105 may comprise a single processor or multiple processors, e.g., a multi-core processor, or multiple separate processors, in some embodiments. Electronic system 100 also includes a volatile memory 115 (e.g., random access memory RAM) coupled with the bus 150 for storing information and instructions for the central processor 105, and a non-volatile memory 110 (e.g., read only memory ROM) coupled with the bus 150 for storing static information and instructions for the processor 105. Electronic system 100 also optionally includes a changeable, non-volatile memory 120 (e.g., flash) for storing information and instructions for the central processor 105 which can be updated after the manufacture of system 100. In some embodiments, only one of ROM 110 or Flash 120 may be present.

Also included in electronic system 100 of FIG. 1 is an optional input device 130. Device 130 can communicate information and command selections to the central processor 105. Input device 130 may be any suitable device for communicating information and/or commands to the electronic system 100. For example, input device 130 may take the form of a keyboard, buttons, a joystick, a track ball, an audio transducer, e.g., a microphone, a touch sensitive digitizer panel, eyeball scanner, and/or the like. A touch sensitive digitizer panel may comprise any suitable technology, e.g., capacitive, resistive, optical, acoustic and/or pressure responsive touch panels. Activation of a "touch" sensitive digitizer panel may not require actual touching of the panel 130 or the electronic system 100, in some embodiments. For example, capacitive touch panels may sense proximity of a user's finger or an eyeball scanner may detect a direction of a user's gaze. Panel 130 may be associated with a display screen, e.g., in an optical path or behind such a display screen, although that is not required. Panel 130 may be a "stand alone" device or integrated into electronic system 100.

The display unit 125 utilized with the electronic system 100 may comprise a liquid crystal display (LCD) device, cathode ray tube (CRT), field emission device (FED, also called flat panel CRT), light emitting diode (LED), plasma display device, electro-luminescent display, electronic paper, electronic ink (e-ink) or other display device suitable for creating graphic images and/or alphanumeric characters recognizable to the user. Display unit 125 may have an associated lighting device, in some embodiments. Display unit 125 may comprise a head-mounted display, in some embodiments.

The touch sensitive digitizer panel 130 is generally associated with the display unit 125. For example, a function of the touch sensitive digitizer panel 130 generally associated with the display unit 125 is to localize a touch input, e.g., from a finger or stylus, to a portion of display unit 125, for example, a single icon image displayed on display unit 125. The touch sensitive digitizer panel may be in front of the actual display device, e.g., in a viewer's optical path, or the touch sensitive digitizer panel may be outside of a viewer's optical path, e.g., behind or to the side of the display device. The touch sensitive digitizer panel 130 may have different planar dimensions in comparison to planar dimensions of a display unit 125. For example, the touch sensitive digitizer panel 130 may be smaller than display unit 125, e.g., the display unit 125 may extend beyond the touch sensitive digitizer panel 130. Similarly, the touch sensitive digitizer panel 130 may be larger than display unit 125, e.g., the touch panel may extend beyond the display unit. The touch sensitive digitizer panel may be integral to a display assembly, or a separate assembly within the electronic system 100. A touch sensitive digitizer panel is not required.

Electronic system 100 also optionally includes an expansion interface 135 coupled with the bus 150. Expansion interface 135 can implement many well known standard expansion interfaces, including without limitation the Secure Digital Card interface, universal serial bus (USB) interface, Compact Flash, Personal Computer (PC) Card interface, CardBus, Peripheral Component Interconnect (PCI) interface, Peripheral Component Interconnect Express (PCI Express), mini-PCI interface, IEEE 1394, Small Computer System Interface (SCSI), Personal Computer Memory Card International Association (PCMCIA) interface, Industry Standard Architecture (ISA) interface, RS-232 interface, and/or the like. In some embodiments of the present invention, expansion interface 135 may comprise signals substantially compliant with the signals of bus 150.

A wide variety of well-known devices may be attached to electronic system 100 via the bus 150 and/or expansion interface 135. Examples of such devices include without limitation rotating magnetic memory devices, flash memory devices, digital cameras, wireless communication modules, digital audio players, biometric monitors, and/or Global Positioning System (GPS) devices.

System 100 also optionally includes a communication port 50. Communication port 50 may be implemented as part of expansion interface 135. When implemented as a separate interface, communication port 50 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 1394 and synchronous ports.

System 100 optionally includes a radio frequency module 160, which may implement a mobile telephone, a wireless network, e.g., IEEE 802.11 ("Wi-Fi"), Bluetooth, a pager, or a digital data link. Radio frequency module 160 may be interfaced directly to bus 150, via communication port 50, via expansion interface 135, or any suitable interface. Various features of electronic system 100 may be implemented by a combination of hardware and/or software. Electronic system 100 may comprise additional software and/or hardware features (not shown) in some embodiments.

Various modules of system 100 may access computer readable media, and the term is known or understood to include removable media, for example, Secure Digital ("SD") cards, CD and/or DVD ROMs, diskettes and the like, as well as non-removable or internal media, for example, hard drives, RAM, ROM, flash, and the like.

Electronic system 100 may comprise one or more geolocation determining features 170. For example, electronic system 100 may determine its position by use of a Global Positioning System (GPS), including, for example, the United States Global Position System, the planned European Union Galileo positioning system, India's Indian Regional Navigational Satellite System and/or the Chinese Compass navigation system. Electronic system 100 may also determine its position via a mobile telephone network, for example, identifying, measuring signal strength, and/or triangulation of cell towers. Electronic system 100 may also determine its position from known locations of wireless networks, e.g., WiFi hotspots, from an internet protocol (IP) address, or any other applicable location service(s). Geolocation determining features 170 may comprise dedicated hardware, or may utilize components with one or more other uses.

It is to be appreciated that the resolution of a capacitive touch screen, is on the order of one division per linear centimeter or less. For example, a 4 inch by 3 inch touch screen may have a display resolution of 1920 by 1080 pixels, but is only able to differentiate touch signals in a 40 by 30 matrix, or less. Based on the limited resolution of touch signals, a matrix of cells is generally created such that any touch within a cell is resolved as being in the same location, e.g., reported as touching within the cell.

It is further to be appreciated that, in general, a capacitive touch screen is able to sense objects in close proximity to, but that are not in contact with, the touch screen. For example, a capacitive touch screen may generate a relatively strong signal, or indication of a signal, for a tool in contact with the screen, while generating a relatively weaker signal for a tool in proximity to, but not in contact with, the screen.

Embodiments in accordance with the present invention gather touch information from cells that indicate actual contact with a tool, as well as cells in areas around the contact cells. In this novel manner, embodiments in accordance with the present invention are able to differentiate among a variety of tools, including, for example, fingers and stylus devices, that may be used with a touch screen.

Figure 2:
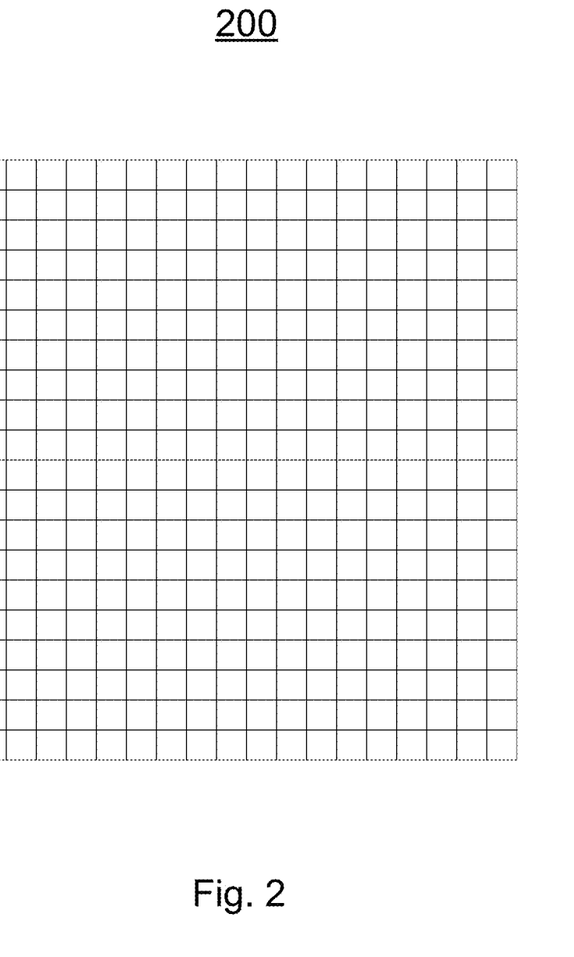
FIG. 2 illustrates a schematic representation of a portion of a capacitive touch screen, in accordance with embodiments of the present invention.

FIG. 2 illustrates a schematic representation 200 of a portion of a capacitive touch screen, in accordance with embodiments of the present invention. Representation 200 is modeled as a 20×20 matrix of touch screen cells. The capacitive touch screen and its sensing circuitry may report a cell value for each sensing cell or "square" of the matrix. For example, a cell value from zero to 31 for five-bit resolution. For example, cell values near zero, e.g., from zero to a noise threshold, may indicate that there is no touch and no proximity. Cell values from ten to 20 indicate proximity. Cell values above 21 indicate contact.

Figure 3:
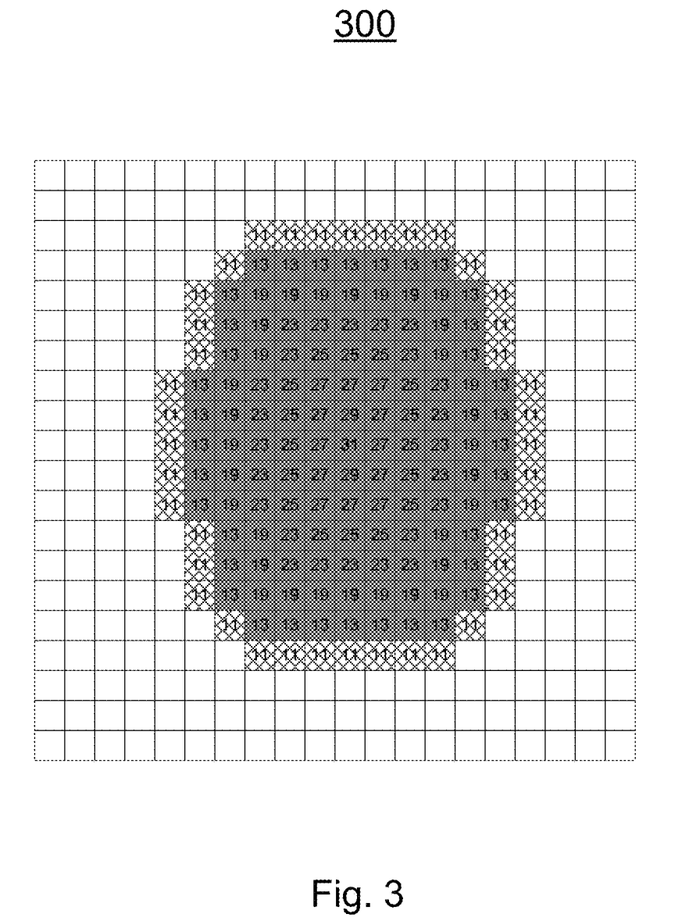
FIG. 3 illustrates an exemplary schematic representation of a portion of a capacitive touch screen with a tool in contact, in accordance with embodiments of the present invention.

FIG. 3 illustrates an exemplary schematic representation 300 of a portion of a capacitive touch screen with a tool in contact, in accordance with embodiments of the present invention. The shaded portions, both cross-hatched and solid, of representation 300 indicate cell values above the noise floor, e.g., above ten in the exemplary value scheme. Portion 300 is a rough outline of that portion of a tool touching, or very near, a touch screen. It is to be appreciated that the shaded cells may represent range of cell values.

FIG. 3 also illustrates determination of a parameter C, known as or referred to as "touch area sample count." Parameter C is a count of the number of touch cells with a value above the noise floor. In the example of FIG. 3, C equals 163. For example, 163 cells have a value above the noise floor.

FIG. 3 further illustrates a cell value for each cell having a value above the noise floor. A second parameter, W, known as or referred to as "touch area weight," is the sum of all cell values for cells with a value above the noise floor. In the example of FIG. 3, W equals 2881.

In addition, FIG. 3 illustrates the perimeter of the shape. The cross-hatched cells indicate the perimeter of the touching object. The parameter P, known as or referred to as "perimeter," is a count of the number of cells on the edge or perimeter of the shape with a value above the noise floor.

Figure 4:
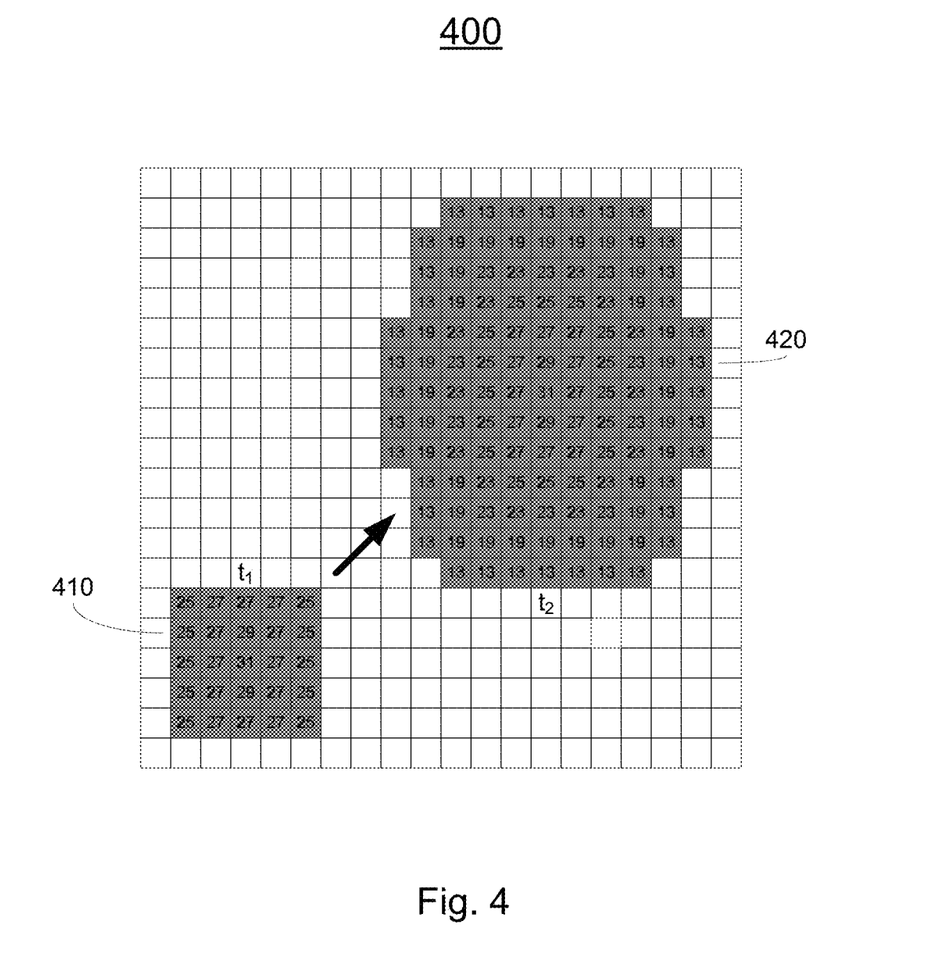
FIG. 4 illustrates an exemplary schematic representation of a portion of a capacitive touch screen with a tool in sequential contact, in accordance with embodiments of the present invention.

FIG. 4 illustrates an exemplary schematic representation 400 of a portion of a capacitive touch screen with a tool in sequential, or extended, contact, in accordance with embodiments of the present invention. For example, a tool in contact with the touch screen is moved from the lower left of a touch screen to the upper right of the touch screen. Shape 410 indicates cells with a value above the noise floor at a first time, t1. Shape 420 indicates cells with a value above the noise floor at a second time, t2. A parameter Cg, known as or referred to as "size gradient," indicates a consistent change of size over time. Cg may be determined as C at t1 minus C at t2.

FIG. 4 further illustrates Wg, known as or referred to as "weight gradient." Wg indicates a consistent change of cell value weight over time. Wg may be determined as W at t1 minus W at t2.

In addition to the measured parameters, a number of derived values may be determined. "Compactness" is a measure of a shape, is determined as the touch area sample count, parameter C, divided by the perimeter, parameter P. "Average weight per sample," Wavg, is determined as the touch area weight divided by the number of samples. A "peak sample value," Vpeak, is the highest sample value in the touch area. The "weight distribution" is determined by the ratio of Wavg divided by Vpeak.

In accordance with embodiments of the present invention, detecting a tool used on a touch screen utilizes a combination of heuristics which are designed to require minimal computational resources so as to operate efficiently on low power processors. Embodiments in accordance with the present invention reliably detects and distinguishes between finger or stylus touches and rejects touches which do not look like either. Embodiments in accordance with the present invention also determine the tool type of a touch based on the following heuristic factors.

Figure 5:
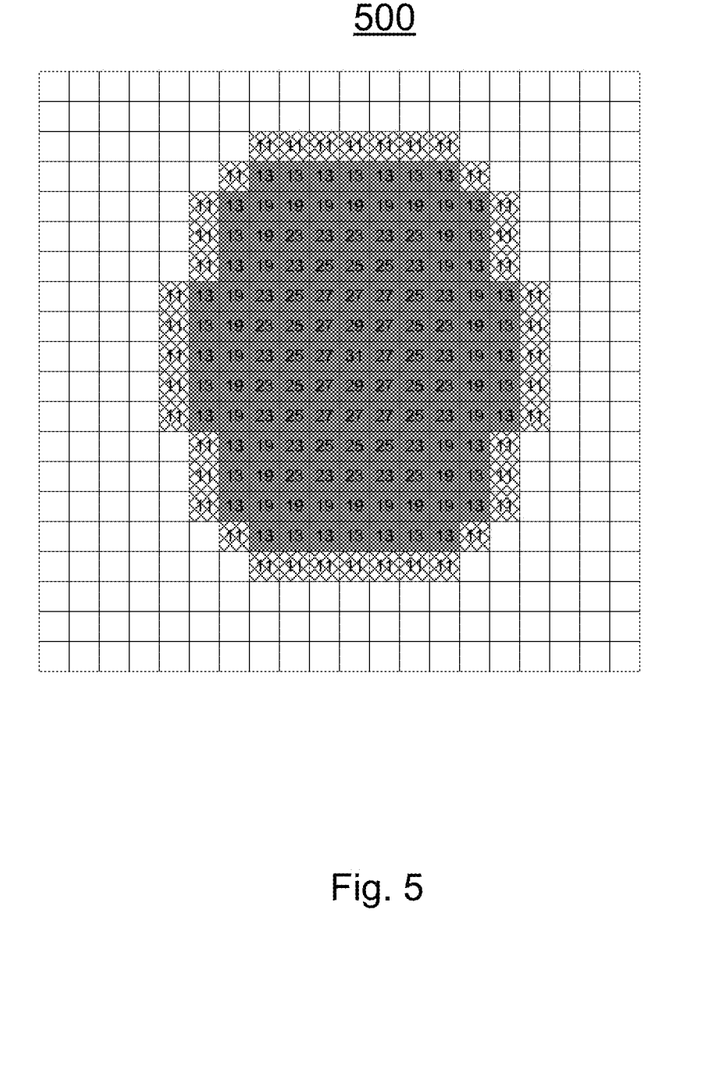
FIG. 5 illustrates an exemplary schematic representation of a portion of a capacitive touch screen indicating a large contact, in accordance with embodiments of the present invention.

FIG. 5 illustrates an exemplary schematic representation 500 of a portion of a capacitive touch screen indicating a large contact, in accordance with embodiments of the present invention. Based on W and C values, a stylus and/or a finger may be rejected. For example, a touched area may be determined to be too large to be a stylus and/or a finger. Similarly, a touched area may be determined to be too large to be a stylus, for example, if a stylus is known to be smaller than a finger.

Figure 6A:
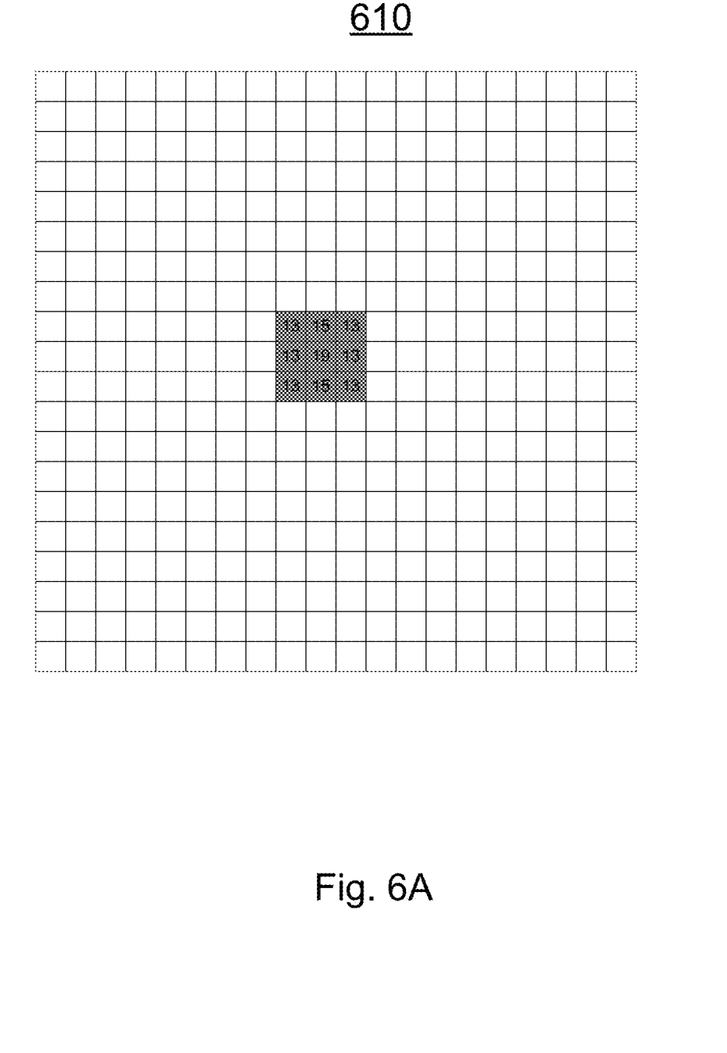
FIGS. 6A, 6B and 6C illustrate a sequence of exemplary schematic representations of a portion of a capacitive touch screen indicating a large contact, in accordance with embodiments of the present invention.
Figure 6B:
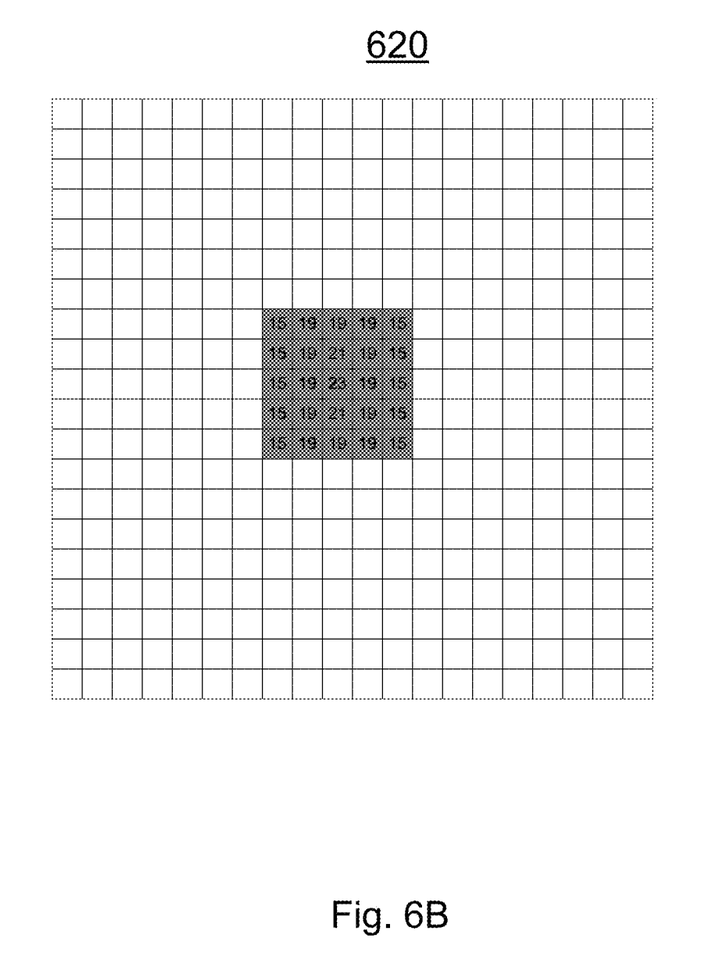
Figure 6C:
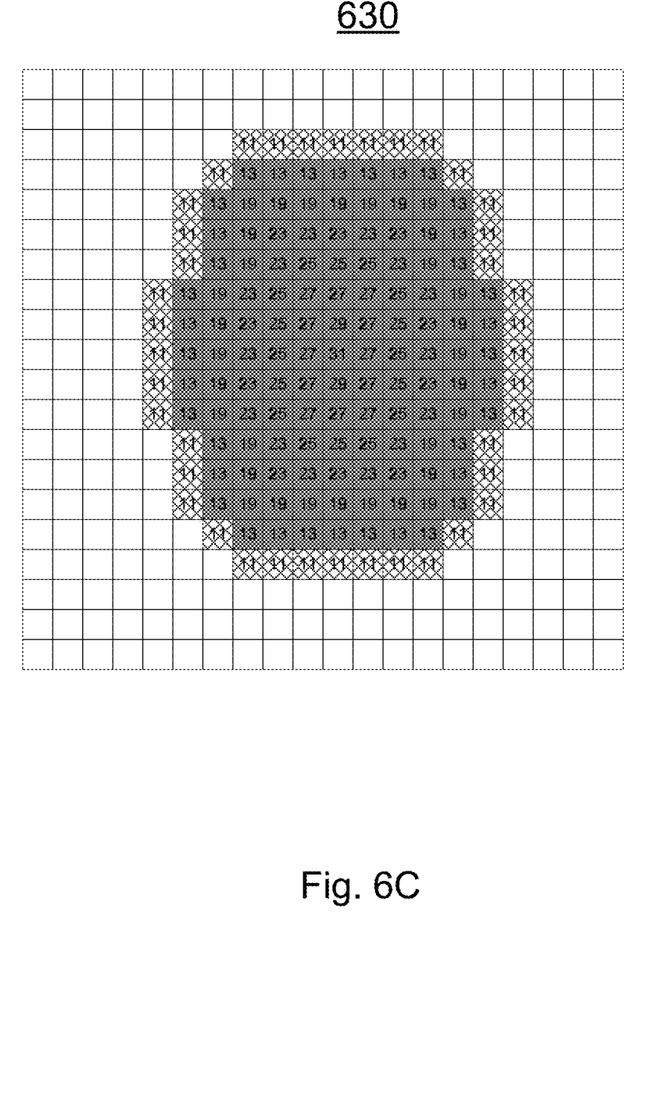

FIGS. 6A, 6B and 6C illustrate a sequence of exemplary schematic representations 610, 620, and 630, respectively, of a portion of a capacitive touch screen indicating a large contact, in accordance with embodiments of the present invention. Large objects like a palm or side of a hand may look like a smaller object, e.g., a finger in first time frame after touch, and is likely to be misidentified if only size or weight criteria is used. It may take some time, e.g., 50 to 100 milliseconds, for a large object like a palm or side of a hand to settle on the touch screen before its correct size is reported. Size and weight gradually increases during this time, which leads to high values for the parameters Wg and Cg. Based on values of Wg and Cg, actual tool size can be predicted rather than using an inaccurate measurement from current sensor image or waiting until the touch tool is settled on the touch screen.

For example, portion 610 of FIG. 6A appears to be a small, sharply defined contact. Portion 620 of FIG. 6B appears to be somewhat larger than portion 610 of FIG. 6A, and indicates greater cell values in general. Portion 630 of FIG. 6C is larger still, and has still greater cell values. In accordance with embodiments of the present invention, even though portion 620 of FIG. 6B may appear, in isolation, to be a stylus, for example, because of the change from portion 610 (FIG. 6A) to portion 620 (FIG. 6B), e.g., increases in cell the touch may be predicted to be a large object, based on increases in Wg and Cg.

Figure 7:
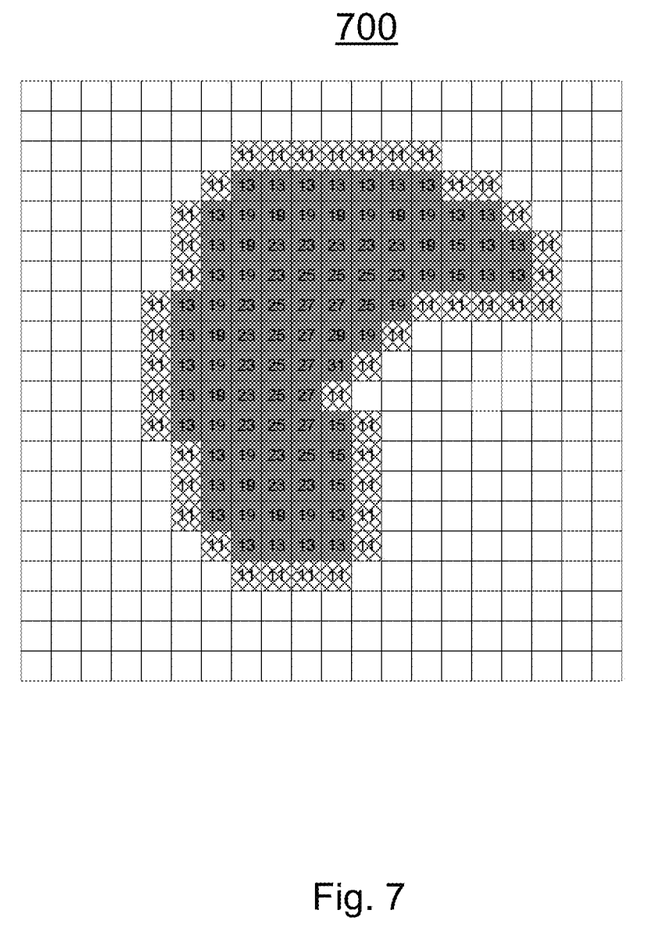
FIG. 7 illustrates an exemplary schematic representation of a portion of a capacitive touch screen indicating an irregular contact, in accordance with embodiments of the present invention.

FIG. 7 illustrates an exemplary schematic representation 700 of a portion of a capacitive touch screen indicating an irregular contact, in accordance with embodiments of the present invention. Non-compact shapes with low size-to-perimeter ratios (C/P) increase probability of being rejected as not being a finger or a stylus.

Figure 8A:
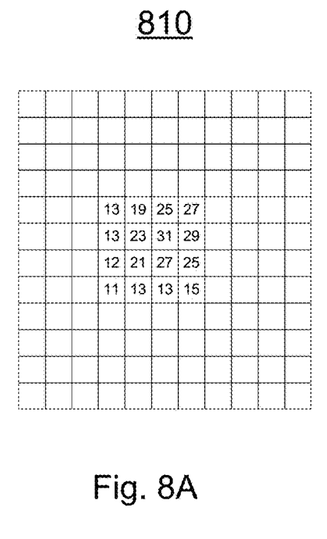
FIGS. 8A and 8B illustrate exemplary schematic representations of a portion of a capacitive touch screen indicating different contacts, in accordance with embodiments of the present invention.
Figure 8B:
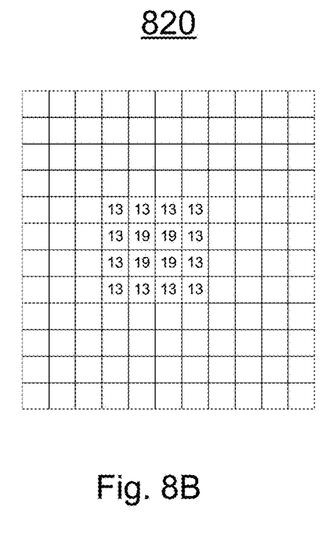

FIGS. 8A and 8B illustrate exemplary schematic representations 810 and 820, respectively, of a portion of a capacitive touch screen indicating different contacts, in accordance with embodiments of the present invention. Portion 810 is representative of a stylus touch, while portion 820 is representative of a finger touch. Portions 810 and 820 are the same nominal size, e.g., 16 cells (C=16). However, portion 810 is non-uniform, e.g., the cell values in the upper right corner are generally larger than the cell values in the lower left. In contrast, the cell values of portion 820 are more uniform. For example, portion 820 is symmetric with respect to horizontal, vertical and diagonal bisection, although such symmetry is not required. In addition, the cell values of portion 810 are generally larger than the cell values of portion 820. For example, the W parameter for portion 810 is 317, while W for portion 820 is 232.

Uneven weight distribution, e.g., a lower Wavg/Vpeak ratio, is more likely for pointy objects like a stylus. For example, Wavg for portion 810 is 317/16=19.8125, while Vpeak for portion 810 is 31. Thus, the Wavg/Vpeak ratio for portion 810 is about 0.64. For portion 820 is about 0.76. Accordingly, a Wavg/Vpeak ratio may differentiate between pointy objects, e.g., a stylus, and "rounder" objects, e.g., a finger.

Accordingly, using the parameters C, W, P, Cg, Wg, C/P ratio, Wavg, Vpeak, and Wavg/Vpeak ratio, ranges may be established that identify and/or reject various tools and other objects that may touch a touch screen. Table 1, below, illustrates an exemplary Tool Identity List, comprising exemplary values of a number of touch-sensing parameters:

TABLE 1

(Tool Identity List)

|  | C | W | Wg | Cg | C/P | Wavg/Vpeak |
|---|---|---|---|---|---|---|
| Finger | medium | medium | small increase | small increase | medium | medium |
| Stylus 1 (round) | Range$_1$ | Range$_1$ | no increase | no increase | larger | low |
| Stylus 2 (square) | Range$_2$ | Range$_2$ | no increase | no increase | large | low |
| palm | large | large | increase | increase | low | large |

It is appreciated that the actual values will vary based on numerous factors, including touch screen size, sensitivity, touch screen resolution and stylus face shape, etc. The length and mass of a stylus may also affect the actual values. For example, a longer and/or heavier stylus may press harder on a touch screen in comparison to a shorter and/or lighter stylus.

Figure 9:
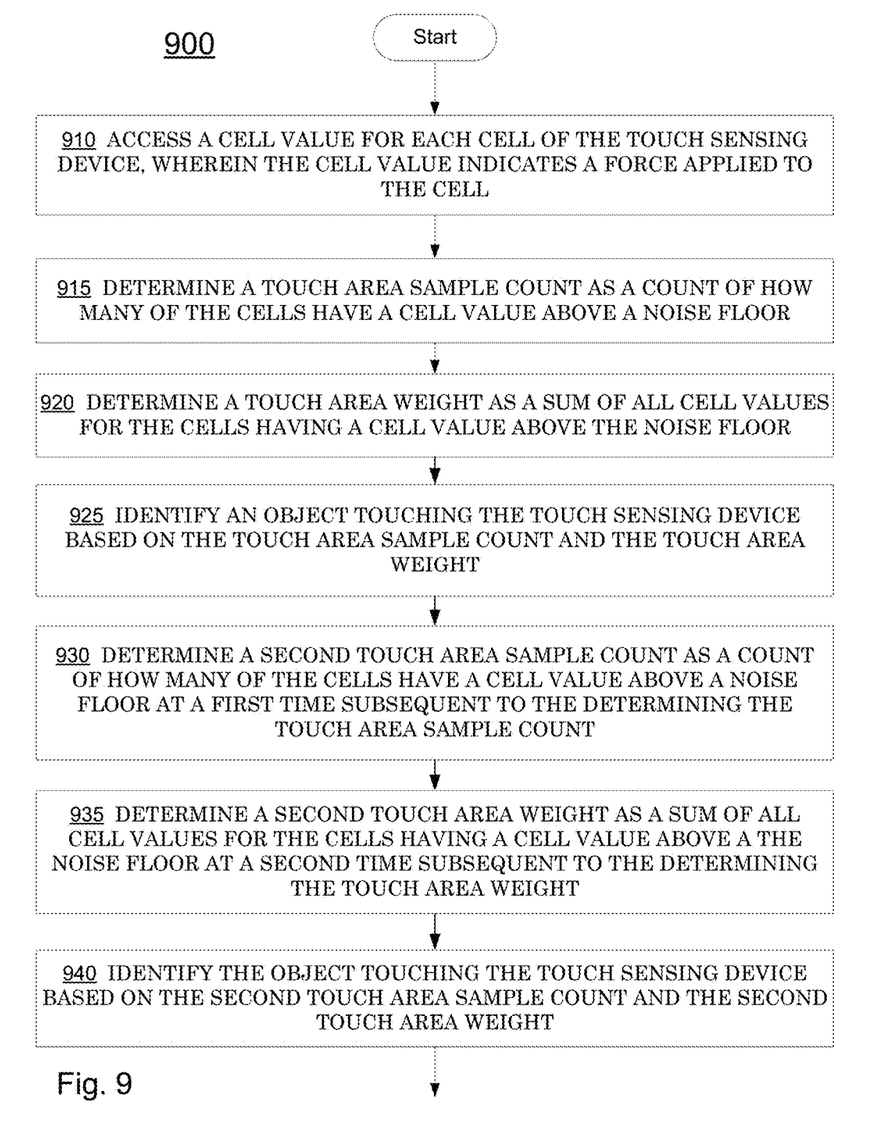
FIG. 9 illustrates a method in accordance with embodiments of the present invention.

FIG. 9 illustrates a method 900 in accordance with embodiments of the present invention. In 910, a cell value is accessed for each cell of the touch sensing device, e.g., touch device 130 of FIG. 1, wherein the cell value indicates a force applied to the cell. In 915, a touch area sample count is determined as a count of how many of the cells have a cell value above a noise floor. In 920, a touch area weight is determined as a sum of all cell values for the cells having a cell value above the noise floor.

In 925, an object touching the touch sensing device is identified based on the touch area sample count and the touch area weight. For example, the touch area sample count and the touch area weight may serve as indexes into a Tool Identity List, e.g., Table 1, above. It is to be appreciated that an exact parameter match is not required.

In optional 930, a second touch area sample count is determined as a count of how many of the cells have a cell value above a noise floor at a first time subsequent to the determining the touch area sample count. In optional 935, a second touch area weight is determined as a sum of all cell values for the cells having a cell value above the noise floor at a second time subsequent to the determining the touch area weight. The first and second times may be substantially the same time. It is appreciated that processors require finite time to complete a task, and generally perform tasks in a sequential manner. "Substantially the same time" may be interpreted as performing one operation immediately subsequent to a prior operation.

In optional 940, the object touching the touch sensing device is identified based on the second touch area sample count and the second touch area weight. In optional 945, a perimeter count is determined as the number of cells having a cell value above the noise floor next to one or more cells having a cell value less than the noise floor. In optional 950, the object touching the touch sensing device is identified based on a ratio of the touch area sample count divided by the perimeter count.

In optional 955, an average weight value of cells having a cell value above the noise floor is determined. In optional 960, a maximum value of cells having a cell value above the noise floor is determined. In optional 965, the object touching the touch sensing device is identified based on a ratio of the average weight value divided by the maximum value.

In optional 970, touch input from the object is rejected if the object is not identified, e.g., the touch area sample count and/or the touch area weight do not correspond to any listed tool. In optional 975, an identity of the object is reported to a software application stored in the memory, e.g., memory 115, memory 110 and/or memory 120 of FIG. 1.

In this novel manner, embodiments in accordance with the present invention are able to differentiate among a variety of tools, including, for example, "intended use" tools, e.g., fingers and styli, and other objects that may make "unwanted" contact with a touch screen, e.g., a palm or a side of a hand, that may be used with or sensed by a touch screen. Embodiments in accordance with the present invention may further differentiate among a plurality of touch tools, e.g., styli, based on their shape and/or weight. For example, embodiments in accordance with the present invention may differentiate among styli that have round, square, non-square rectangular, large and small faces, and combinations thereof.

Embodiments in accordance with the present invention provide systems and methods for detecting a tool used on a touch screen. In addition, embodiments in accordance with the present invention provide systems and methods for detecting a tool used on a touch screen that reduce system requirements and enable improved system performance. Further, embodiments in accordance with the present invention provide systems and methods for detecting a tool used on a touch screen that may differentiate among a variety of touch tools. Still further, embodiments in accordance with the present invention provide systems and methods for detecting a tool used on a touch screen that are compatible and complementary with existing systems and methods of touch screen, manufacture, test and operation.

Various embodiments of the invention are thus described. While the present invention has been described in particular embodiments, it should be appreciated that the invention should not be construed as limited by such embodiments, but rather construed according to the below claims.

What is claimed is:

1. A method comprising:
    accessing a cell value for each cell of a touch screen, wherein said cell value indicates a force applied to said cell;
    determining a touch area sample count as a count of how many of said cells have a cell value above a noise floor;
    determining a touch area weight as a sum of all cell values for said cells having a cell value above a said noise floor;
    identifying an object touching said touch screen based on said touch area sample count and said touch area weight;
    determining a second touch area sample count as a count of how many of said cells have a cell value above a noise floor at a first time subsequent to said determining said touch area sample count;
    determining a second touch area weight as a sum of all cell values for said cells having a cell value above a said noise floor at a second time subsequent to said determining said touch area weight; and
    identifying said object touching said touch screen based on said second touch area sample count and said second touch area weight.

2. The method of claim 1 further comprising:
    rejecting touch input from said object if said object is not identified.

3. The method of claim 1 further comprising:
reporting an identity of said object to a software application.

4. The method of claim 1 wherein said first and second time are substantially the same.

5. The method of claim 1 further comprising:
determining a perimeter count as the number of cells having a cell value above said noise floor next to one or more cells having a cell value less than said noise floor; and
identifying said object touching said touch screen based on a ratio of said touch area sample count divided by said perimeter count.

6. The method of claim 1 further comprising:
determining an average weight value of cells having a cell value above said noise floor;
determining a maximum value of cells having a cell value above said noise floor; and
identifying said object touching said touch screen based on a ratio of said average weight value divided by said maximum value.

7. An electronic system comprising:
a capacitive touch sensing device;
a processor coupled to said capacitive touch sensing device;
a memory coupled to said processor, wherein said electronic system is configured to:
access a cell value for each cell of said touch sensing device, wherein said cell value indicates a force applied to said cell;
determine a touch area sample count as a count of how many of said cells have a cell value above a noise floor;
determine a touch area weight as a sum of all cell values for said cells having a cell value above a said noise floor;
identify an object touching said touch sensing device based on said touch area sample count and said touch area weight;
determine a second touch area sample count as a count of how many of said cells have a cell value above a noise floor at a first time subsequent to said determining said touch area sample count;
determine a second touch area weight as a sum of all cell values for said cells having a cell value above a said noise floor at a second time subsequent to said determining said touch area weight; and
identify said object touching said touch sensing device based on said second touch area sample count and said second touch area weight.

8. The electronic system of claim 7 wherein said electronic system is further configured to:
reject touch input from said object if said object is not identified.

9. The electronic system of claim 7 wherein said electronic system is further configured to:
report an identity of said object to a software application stored in said memory.

10. The electronic system of claim 7 wherein said first and second time are substantially the same.

11. The electronic system of claim 7 wherein said electronic system is further configured to:
determine a perimeter count as the number of cells having a cell value above said noise floor next to one or more cells having a cell value less than said noise floor; and
identify said object touching said touch sensing device based on a ratio of said touch area sample count divided by said perimeter count.

12. The electronic system of claim 7 wherein said electronic system is further configured to:
determine an average weight value of cells having a cell value above said noise floor;
determine a maximum value of cells having a cell value above said noise floor; and
identify said object touching said touch sensing device based on a ratio of said average weight value divided by said maximum value.

13. An article of manufacture including a non-transitory computer readable medium having instructions stored thereon that, responsive to execution by an electronic system, cause said electronic system to perform operations comprising:
accessing a cell value for each cell of a touch screen, wherein said cell value indicates a force applied to said cell;
determining a touch area sample count as a count of how many of said cells have a cell value above a noise floor;
determining a touch area weight as a sum of all cell values for said cells having a cell value above a said noise floor;
identifying an object touching said touch screen based on said touch area sample count and said touch area weight;
determining a second touch area sample count as a count of how many of said cells have a cell value above a noise floor at a first time subsequent to said determining said touch area sample count;
determining a second touch area weight as a sum of all cell values for said cells having a cell value above a said noise floor at a second time subsequent to said determining said touch area weight; and
identifying said object touching said touch screen based on said second touch area sample count and said second touch area weight.

14. The method of claim 13 further comprising:
rejecting touch input from said object if said object is not identified.

15. The method of claim 13 further comprising:
reporting an identity of said object to a software application.

16. The method of claim 13 further comprising:
determining a perimeter count as the number of cells having a cell value above said noise floor next to one or more cells having a cell value less than said noise floor; and
identifying said object touching said touch screen based on a ratio of said touch area sample count divided by said perimeter count.

17. The method of claim 13 further comprising:
determining an average weight value of cells having a cell value above said noise floor;
determining a maximum value of cells having a cell value above said noise floor; and
identifying said object touching said touch screen based on a ratio of said average weight value divided by said maximum value.

* * * * *